United States Patent [19]

Jarossay et al.

[11] Patent Number: 5,734,907
[45] Date of Patent: Mar. 31, 1998

[54] METHOD OF PROGRAMMING AN INFORMATION PROCESSING DEVICE FOR NETWORK MANAGEMENT APPLICATIONS USING GENERIC PROGRAMMING

[75] Inventors: Myléne Jarossay, Malakoff; Denis Attal, Chatillon, both of France

[73] Assignee: Bull, S.A., Paris, France

[21] Appl. No.: 479,563

[22] Filed: Jun. 7, 1995

Related U.S. Application Data

[63] Continuation of Ser. No. 30,711, Mar. 12, 1993, abandoned.

[30] Foreign Application Priority Data

Mar. 12, 1992 [FR] France ................................. 92 02976

[51] Int. Cl.$^6$ ......................................................... G06F 9/44
[52] U.S. Cl. ................................................................ 395/708
[58] Field of Search ............................... 395/640, 703–708, 395/611, 612

[56] References Cited

U.S. PATENT DOCUMENTS 5,295,222  3/1994  Wadhwa et al. ........................ 395/700
5,491,796  2/1996  Wanderer et al. ................... 395/650 X

*Primary Examiner*—Thomas M. Heckler
*Attorney, Agent, or Firm*—Kerkam, Stowell, Kondracki & Clarke, P.C.; Edward J. Kondracki

[57] ABSTRACT

Method of programming an information processing system having a plurality of data processing devices connected with a network and having access to data stored in complex structures, such as sets or trees, including providing a programming language on said information processing system in which data types of variables used therein are defined by the content of the variables, allowing program variables used with said programming language to be defined without assigning a predetermined data type thereto, developing application programs of the network management type using said programming language, manipulating said complex data structures using said application programs by requesting and receiving data from said complex data structures without designating particular data types of the data to be received, and providing a language interpreter for said programming language on each of said plurality of data processing devices.

8 Claims, 3 Drawing Sheets

METHOD OF PROGRAMMING AN INFORMATION PROCESSING DEVICE FOR NETWORK MANAGEMENT APPLICATIONS USING GENERIC PROGRAMMING

This is a continuation of application Ser. No. 08/030,711 filed Mar. 12, 1993, now abandoned.

FIELD OF THE INVENTION

The present invention relates to the use of a language, in which the typing bears on the contents of variables rather than on the variables, and which furthermore enables the manipulation of complex structures such as sets or trees.

BACKGROUND OF THE INVENTION

Traditionally, this type of language is essentially used in the field of artificial intelligence. Compared with conventional languages, this type of language makes the functional object manipulable without restriction and provides effective recursive programming and automatic management of the data program memory. In addition, because both the programs and data are represented in similar fashion, a program can modify itself to take new events into account. Nevertheless, its use is not highly regarded, except for its application to the field of artificial intelligence, and in particular there are a great number of prejudices against its use in other fields, especially the field of applications programs of the network management type.

In this last field, specific programming languages exist for certain applications. A language of the Smalltalk type is used for a first family of applications, whose object is to provide interfaces for access to service that are simplified and facilitate generic programming, or in other words in which the data structure is manipulated directly without knowledge of the contents of the data. In effect, in this type of language, the typing bears on the content of the variables more than on the variables, a characteristic which makes for effective response to the problems presented by this first family of applications.

However, when it is desired to create interfaces with relational data bases, which have complex data structures, another type of language must be used, such as SQL, which also has this cartesian nature but contrarily does not make it possible to facilitate generic programming. Other problems also arise when there is a need to create interfaces that respect the treelike nature of a plurality of servers, such as network administration platforms, for example. Hence each application family has a corresponding adapted language type. This situation is not very practical and means a lack of flexibility when there is a need to develop applications programs of the network management type to enable creating interfaces with relational data bases, while authorizing the drawing up of requests to information servers without prior knowledge of the structure of the value received in return.

SUMMARY OF THE INVENTION

The object of the present invention is to overcome this major disadvantage and to propose the use of a language in which the typing bears on the content of the variables and which moreover enables manipulation of complex data structures.

To achieve this, the language of the type discussed above is used in applications programs of the network management type, which are intended on the one hand to create interfaces for access to servers by authorizing generic programming, and on the other to create interfaces that respect the cartesian nature and complex data structures of relational data bases and the treelike nature of a plurality of servers, with each machine of the network having an interpreter of this language.

Thus the concept of the invention consists, contrary to every expectation, of using a symbolic programming language, which is designed to be applied essentially to the field of artificial intelligence, in applications programs of the network management type. This language in fact simultaneously has the set of characteristics desired for developing the applications programs mentioned above. Unlike the versions in the prior art, only a single language is used, which lends great flexibility and considerable efficiency. The programs can accordingly manipulate the data without knowledge of their contents, and hence has an advantageous generic nature, in particular in terms of the requests that may be addressed to information servers without prior knowledge of the structures of the values received in return; it is readily apparent that this considerably simplifies the interface for access to these servers. In such a language, the variables actually have no type, because they are all assumed to exist in an indeterminate state, and it is at the moment of an assignment that the type is defined at the same time, with the code adapting to various applications. Furthermore, because of this very high-level language, which has a cartesian or set theory nature, it is extremely simple to create interfaces with the various information servers, these interfaces making it possible on the one hand to respect the likewise cartesian nature of structured languages such as SQL, thus authorizing access to relational data bases, and on the other of respecting the treelike nature of certain servers used, particularly for network administration platforms. Finally, and consequently, the use of such a programming language makes it possible to very significantly shorten development time required for an application.

In a preferred application of the present invention, the language used is a language of the Lisp type.

In addition, to permit the dialogue in this language between the various machines of the network, each of these machines has an interpreter of this language.

In a notable fashion, the interpreter of the language of each machine is principally constituted by kernel for handling the program to be run by relying both on internal services, that is, evaluator and memory management, and on the code that executes the primitive functions of the language, and by a documented programmatic interface between the nucleus and the code executing the primitive functions, for authorizing access to a plurality of services and facillitating the extension of the language and the interpreter to new primitive functions.

This interpreter enables easy, fast and effective development of a desired application. Because of the language used, the various functions may be coded (in an environment constituted by the interpreter and various libraries to which the interpreter has access) and tested rapidly without going through the usual phases of compilation, linkage and execution that are necessary for other programming languages. Hence the code is never compiled, and when the interpreter is invoked, any code that exists is loaded and interpreted immediately. The programmatic interface affords access to various services; it must be clear and documented in order advantageously to facilitate the extension of the language and the interpreter itself to new primitive functions, which by way of example offer access to new servers.

BRIEF DESCRIPTION OF THE DRAWINGS

The following description in conjunction with the accompanying drawings, all given by way of non-limiting example, will enable better comprehension of how the invention can be achieved.

DETAILED DESCRIPTION OF THE PREFERRED EMBODIMENTS

Figure 1:
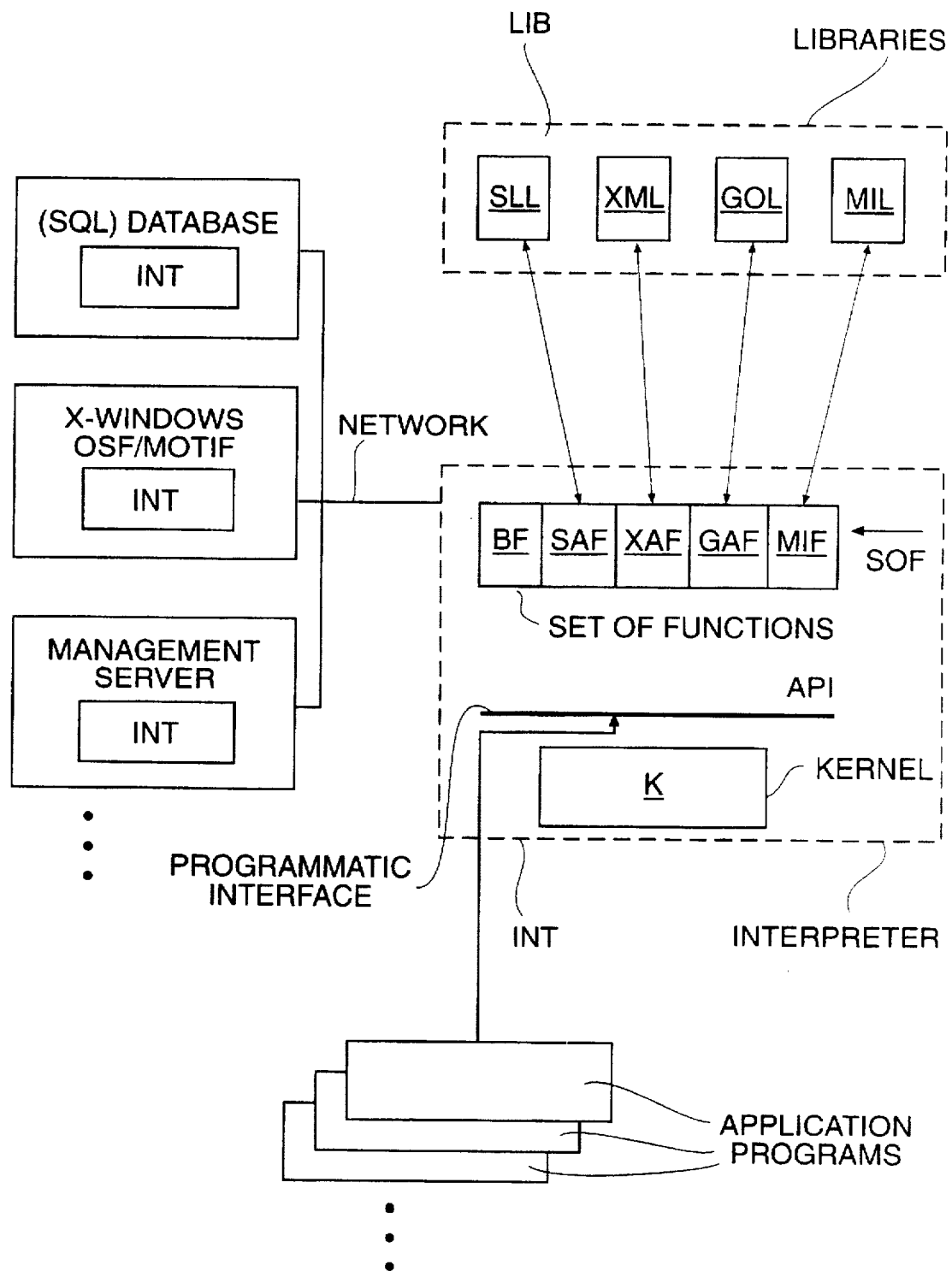
FIG. 1 shows a structural example of the present invention including an interpreter and a set of libraries, as well as processing devices and application programs.

In FIG. 1, the interpreter is identified by the symbol INT and the set of libraries by LIB. The language interpreter INT is composed principally of a nucleus kernel K, a programmatic interface API, and a set of functions SOF employing the primitive functions of the interpreter INT. Two categories in this set of functions can be roughly distinguished: a first, in which the basic functions BF are arrayed, in other words the functions specific to the language whose typing bears on the contents of the variables and enables manipulation of complex constructions, such as and advantageously the basic functions of Lisp, and a second, to which the extended functions belong that assure the interface with different services represented by the symbol LIB. Hence in the example shown in FIG. 1, a set of functions SAF enables access to a library specific to a structured language SLL serving in turn as an interface with relational data bases (not shown). Another set of functions XAF enables access to a library XML, whose object is to furnish components for developing and managing graphical user interfaces. A third set of functions GAF enables access to a library GOL authorizing the applications that use the graphic objects developed. A fourth set of functions MIF enables access to a library MIL that serves in turn as an interface with network and information service management services.

For the first or second category in this set of functions, the use of a primitive function of the language used according to the invention (this language will be called SML hereinafter, for the sake of simplification) leads to the execution of a procedure which is known as a function coding a primitive.

A function coding a primitive is itself compiled like the remainder of the interpreter being written originally, for example in the language known as C. The input arguments are received in SML, because they originate in a calling device that operates in SML. Similarly, the value returned to the calling device is always in SML.

With respect to basic functions BF (in SML), once the function coding a primitive has accomplished its task, a return to the calling device is made. However, in the case where an SML function call represents a request for access to one of the services proposed by the set LIB, then the function coding a primitive must perform additional work, which generally leads to the execution of the following tasks:

validation of the input arguments (in SML);

if there is no error, conversion of arguments in SML into arguments in a language of the C type;

calling of a procedure in one of the external libraries of the set LIB furnishing the input arguments in the C-type language;

after returning from the external procedure, returning to the calling device furnishing a return value in SML.

Furthermore, regardless of the subject of the present invention, the SML language makes it possible to employ a very great number of applications in the field of distributed information processing, which is also known as cooperative information processing.

In general, this language advantageously has the characteristic of the languages of the Lisp type and proposes to furnish effective and coherent means for access, (or handling) manipulation and presentation of management information (or services) for networks and information systems. To do so, it must follow the following main rules:

the objects managed are defined by the rules of the ISO standard;

the operations on the objects managed are coherent and are in accordance with those described in the ISO standard for the use of network services and management information systems (see ISO CMIS);

access to data bases if possible by way of a structured language, such as SQL;

the user interface, for example for dialogue or information display, is managed by way of functions that enable access on the one hand to development and management components of the graphic user interfaces, such as X/Motif, and on the other to applications using the graphic objects developed, such as the system known as GO (for Graphic Objects).

The language SML used in accordance with the invention is influenced by the language known as "Common Lisp", but does not necessarily seek to be completely compatible with it, because SML seeks to achieve fundamentally different objectives of "Common Lisp" or of any other Lisp dialect. In fact, in their entirety, Lisp dialects are widely used in the field of artificial intelligence, while the SML language is adapted for applications programs of the network management type. For this reason, there are substantially fewer basic functions necessary in SML than there are functions proposed in "Common Lisp", for example.

Other differences exist between SML and "Common Lisp". In SML, an atom may have a single value, while the conventional Lisp dialects make it possible, for example, to give the same name to both a variable and a function, without any risk of conflict between them. Similarly, in SML, the lists are manipulated internally as tables, so as to speed up the scanning operations for analysis and exploration of the information.

It is also important to note that the objects managed in a management data base (this base contains all the information useful for a given application), which have a tree structure, are easily represented in the form of lists, this representation being attained in a completely natural manner for the SML language.

The external libraries of the set LIB are constituted of compiled procedures written originally in a language of the C type, but unlike the functions coding the primitives, they ignore the arguments or objects of the SML type. The functions coding primatives perform a conversion of the SML-type arguments into C-type language, or vice versa, and thus can be considered as procedures that link the external libraries of the set LIB with the SML functions.

The use of such functions as XAF or MIF is obligatory, both to enable the user to have access to any application and to enable retrieval of information contained in a management service of networks and information systems (data base, for example), the use of the GOF functions, while useful, it not obligatory, while the use of the SAF functions is never obligatory for an application, the fact, the SAF functions are used only to enable creation of and/or access to relational data bases. Either the relation with such a data base may be set up for one use, specific to one application, or the data base may be shared among several applications.

The interface API authorizes the application of any function SAF, XAF, GAF, MIF by way of a function BF in SML, which brings about the execution of a function coding a primitive SML. After some operations of verification and basic formatting, the function coding the primitive SML invokes the proper function enabling access to one of the external libraries of the set LIB.

In addition, the role of the kernel is to create the link between a call of a function SML and a function coding a primitive SML. The functions coding the SML primitives, like the functions SAF, XAF, GAF, MIF, are procedures in C-type language, with code compilation. The call of the original function SML is itself interpreted. In general, the interpretation phase amounts to less than 1% of the execution time, while the very great majority of the processing time is spent in executing compiled codes.

A major and advantageous characteristic of the SML environment has to do with its reactivity to external events. Hence by means of the interface, an SML application can access various services and ask that it be informed of any event produced as a result. For example, the action of a user (on a keyboard, screen, mouse, etc) may be considered as a specific event which "wakes up" an SML application, making it possible to begin a dialog with the user. This "wakeup" operation involves the execution of specific SML procedures with a view to processing the event. Such procedures, known as "callback" procedures, are extremely important for the development of any SML application.

An SML application is in a position to process events after calls to the appropriate source of events have been made and after it has furnished the name of the callback procedure that is to be triggered when an event occurs.

An SML application may in fact be considered as a collection of callback procedures. When the application is begun and after initialization, it notifies the event sources of its requirements by furnishing the names of the appropriate callback procedures. The application then waits for the appearance of these events.

The events that occur are managed by the kernel K of the SML interpreter. Hence the nucleus is not solely responsible for the relations among the SML calls and the functions coding the primitives SML, but also for the processing of the events. When an event originating in a given source occurs, the kernel waits, if needed, for the inactivity of the application and then activates the appropriate return procedure.

If an application is currently processing an event and some other event occurs, then the kernel waits for the task in progress to be achieved before activating the return procedure corresponding to the new event. Hence events may remain in a processing queue for a given application, with the first one in the queue being the next one to be processed. There is no concept of priority for processing events.

In accordance with the programming concepts relating to the present invention, an arbitrary SML application that is to be developed should in principle perform the following two essential tasks:

create an interface with the user, which incolces the display on the screen of objects (windows, dialog boxes, buttons, etc) used to control the dialog between the user and the application, and retrieve, manipulate, and display the information requested by the user.

The SML language furnishes the interface with the various functions that authorize the execution of these two essential tasks.

In the usual way, the user interface is coded for the use of development and graphical user interface management systems, such as the known OSF/Motif-X/Windows system (trademarks of the Open Software Foundation and MIT, respectively). The SML language furnishes the interface for the compiled functions XAF that access the external library XML, an example being X/Motif.

Once the application has determined the information requested by the user, it must retrieve this information in the next step.

The information set that must be made available for the various applications is called the managed information base or MIB. This base does not consist of a simple data directory, as is true for a centralized data base, but rather is conceptual in nature, because it represents the information that may be furnished when it is required.

Accordingly, retrieval of information in the base MIB does not involve a request for access to a data base. It involves the request for information on the basis of a component that is capable of furnishing the information required. Each of its components manages one portion of the base MIB.

The interaction between an application (requesting component) and an information manager (a component that furnishes information) is obtained by means of messages sent between the two components. A manager will respond to the requests for information by supplying the application with portions of objects that it knows; the manager of these objects will hereinafter be called the object manager.

From the semantic point of view, the environment to which the invention applies uses an object-oriented paradigm, which means that a programmer will not use a procedure-oriented approach. An object differs from a procedure in that it is an entity by which a certain number of actions can be requested. The data specific to an object are never manipulated directly by anything other than the object itself, and there is no concept of global data as is generally true for the "procedure-oriented" model.

To develop an application in the present context, using an "object-oriented" model, it must be remembered that an entity that sends a message to an object has not waited for the end of processing of the message by the object, but instead, because operation is asynchronous, can send other messages to other objects while waiting for the response to the message sent to the first object. Contrarily, when a procedure is invoked, the call code blocks any other call as long as this procedure has not been acknowledged, since the operation is synchronous.

When these various applications are employed, the messages may designate and be applied directly to an object, because this object itself does not process the messages sent by an application; it is the object manager that performs the processing.

This applications and object manager model can be likened to the client-server model, in which the applications of the clients and the object managers are the servers. This requires merely that the applications request the services of the object managers. When an object manager receives a message sent by an application, it interprets and processes the message.

If an integrator agent is considered to be an object manager that furnishes information to an application that has sent a request, then this integrator agent, to furnish this information, must communicate via an interface with an agent (generally a component of another system) that manages the attribute values of a managed object of a management information base.

One important characteristic of an application is that it interacts directly with the user, which an object manager does not do. An application receives requests by way of the user interface and sends the information to the user, while contrarily an application does not manage the objects, just as it does not act for other applications or other object managers.

As has been noted above, an application reacts to events, which means that it effectively waits until an event, such as the interaction of a user, occurs. However, the application does not itself generate events; events are generated solely by the object managers.

When an application is used in an SML environment, it must prepare to respond to the interactions with a user. The requests for information from a user cause interactions between the application and one or more object managers. This then requires the active presence of the manager or managers on the one hand, and on the other that this manager or managers be ready to receive the messages sent by the applications. To do so, the managers are always ready for operation and must remain actively present as long as the applications are active.

In this context, all the applications and object managers communicate with one another by way of communications infrastructures that use standard protocols and services.

This infrastructure includes the communications management services, which in turn include the network and information system management services.

Both the applications and the object managers have access to the network and information system management services (based on the ISO CMIS standard). An application has access to these services (such as CMIS) by way of the interface API by means of the functions BF and MIF from the external library MIL, which in turn serves as an interface with the services, such as CMIS.

Two major services may be rendered to the applications in question by the network and information system management services, such as CMIS:

furnishing a dispatching or switching service between the applications and the object managers, by determining which manager is to receive a message sent by an application, as a function of the type of object that the application specifies (since the application does not know whether the object manager is located in the same system or a different system).

proposing to the applications functions that authorize the execution of operations on the managed objects of a managed objects base, of which the most important operations are the following:

GET: retrieves information from an object (the values of these attributes), which is the most frequently used operation.

CANCEL GET: enables an application to notify the network and information system management services that the number of responses already received after a GET operation is sufficient, and consequently any other response from an object manager must be rejected.

SET: gives the specifies values to the attibutes of the objects.

CREATE: creates an object instance.

DELETE: cancels an object instance.

An application cannot define the attribute values unless the definition of the object authorizes that operation. This is also true for the CREATE and DELETE operations.

One (nonlimiting) example of a set of functions BF in the language SML is described below with respect to certain conventions on the one hand and to its syntactical description on the other.

By convention:

A literal symbol indicates that it is itself a datum rather than a reference symbol.

An asterisk (*) indicates that the symbol preceding it is operation, and that it may be repeated as many times as desired.

A plus sign (+) indicates that the symbol preceding may be repeated as many times as desired, but it must be present at least once.

Curly braces ({ }) indicate that the group of symbols between the square brackets is considered to be a single term.

Square brackets ([]) indicate that the group of symbols between parentheses is operation.

A separation bar (l) indicates that several alternatives exist.

Any comment begins with a semicolon and ends at the end of the line.

The numbers are represented by 32 bits with a sign and can be written in decimal form (by default), hexadecimal form (#x or 0x), or in their ASCII code (#/J).

The symbols are identifiers that enable naming functions or variables.

A symbol that begins with a colon (:) is a key word. Key words are used in the definition of functions.

The symbols in the SML language are monoevaluated, and consequently a symbol can be refer to a function or a variable, but not to both.

As in any Lisp dialect, a list is both a data structure and a program structure. By default, a list is evaluated, and the first element must be a function. An evaluation can nevertheless be avoided by using the function (').

Lists are the extendable sets of consecutive elements stored in a memory, and consequently they do not have the conventional Lisp structure of concatenated cells. Lists or list strings (sets of lists) are nevertheless processed as Common Lisp sequences. An "property" list is a special list composed of pairs, each pair containing an attribute and its associated value; the attribute should be a symbol.

The list strings are enclosed in quotation marks.

The principal control functions will now be enumerated.

"Catch" and "throw": These functions, manipulated in a relatively exceptional manner, offer a powerful mechanism for exiting from complex processing. The "catch" function evaluates a form, but if a "throw" with the same tag occurs during the evaluation of the "form" this evaluation is not completed, and "catch" returns the evaluation of the "result".

The tag must be defined as a target for the transfer of control. "Catch" and "throw" are paired. Several combinations of "catch" and "throw" may be used with different tags. A "catch" necessarily corresponds to a "throw", if a "throw" is encountered with an unknown tag, then an error is signalled.

"Cond": This is a conditional test. This function evaluates the "form" that is associated with the first test that returns a verified condition. The function returns the evaluation of the last of its forms. If no form is present, then a simple test value is returned. When each test returns a "nil" (nothing is found), then the "cond" function returns a "nil".

"Do": This function performs a general iteration; it furnishes a generalized iteration mechanism with an arbitrary numerical index. At the beginning, the variables are linked with their initial value, and then the function makes a loop which functions as follows:

Evaluation of the final test: If this attribute is verified and "results" are specified, the "results" are evaluated and the last evaluation is returned. If no "results" are specified, "nil" is returned.

Evaluation of each "form".

Evaluation of expressions "stepwise" from left to right: Each result is linked with the corresponding variable index. If "step" is omitted, the variable remains unchanged.

"Dolist": This function performs an interation in the elements of a list; it excessively assigns each element of the list to a "variable" and evaluates each "form". If "result" is omitted, then "nil" is returned.

"Dotimes": This function makes it possible to create a loop from 0 to (n−1), by proceeding as follows. First, it evaluates the number of the turn to be performed, and this number must be an integer. Next and successively, it assigns the integers from 0 to (number evaluated—1). For each iteration, the instructions of each form are executed. If the number evaluated is equal to 0 or to a negative value, the instructions are not executed. The result of this function is the evaluation of "result"; if the result is omitted the result is "nil".

"Eval": This function evaluates an SML expression in the instantaneous environment. A double evaluation is given, since the argument is evaluted by SML before being evaluated by this function.

"Exit": This function encloses the SML environment by terminating the execution.

"For" and "mapfor": These functions perform an iteration in a list of values. They successively assign a "variable" (not evaluated) to each of the list of evaluated values and execute the instructions. "For" returns the value of the evaluation of the last construction of the last iteration, while "mapfor" constructs a list composed of the successive "instruction" values for the iterations.

"If": Conditional test, whose function is similar to "cond", but with one level of parenthesis cancelled. It executes the portion "then" of the first condition verified, or the portion "else" (if any), if no prior condition has been verified.

"let": This function announces a local variable, by functioning as follows:

Evaluation of all the initial values, and linkage of these values with the corresponding variables.

Sequential evaluation of each "form".

If no initial value has been associated with a variable, then "nil" is initialized. The return value of the function is the value returned by the last "form".

"Progn": This function sequentially executes instructions, evaluates each "form", and returns the result of the last evaluation. It is useful when more than one instruction is expected, for example in the "then" portions of an "if" instruction.

"Quote" or "/": The purpose of this function is to prevent an evaluation. It returns the object without evaluating it.

"Set" or "setq": This function is used to assign a value to a variable. It is the equivalent of the function that assigns the Lisp dialects. In its "setq" form, the first argument is not evaluated, while in its "set" form, it is evaluated. These two functions evaluate the second argument and define the value of the first argument at the resultant value. The definition of the active values does not modify their value, but invoke a predetermined function for the value.

"Some" and "every": These two functions bring about an iteration to look for an attribute in a list. To do so, they apply an attribute function to each element on a list. "Some" applies the function until a value that is not "nil" is returned and then returns that value; otherwise, it returns "nil" at the end. "Every" applies the function until the return of a value "nil" and returns "nil", and otherwise at the end returns the last result obtained. The number of data lists must be equal to the number of arguments of the function applied. Hence the function is applied n times when n is the length of the first data list.

If one of the other lists has a size less then the first, it is considered to be a list of the same size as the first one obtained, by adding its last element to the end as many times as necessary. If the first list has a size less then another list, then only the first n elements of the other lists are labeled.

"Unless": This function, which is a negative conditional test, executes each instruction and returns the value of the last one, if the condition is evaluated at the value "nil"; if not, "nil" is returned. This is the converse of the "when" function described below.

"Unwind-protect": This function returns the evaluation of the "protected form", but guarantees an exit attempt via an internal "throw"; each "form" is evaluated in sequence before obeying "throw".

"When": This function, a positive conditional test, executes each instruction and returns the value of the last one if the condition evaluated is verified; if not, "nil" is returned.

"While": This function executes each instruction in sequence until a "nil" condition. The function always returns "nil".

"With" or "with-eval": These functions announce a local variable. They are constructions used to announce and initialize variables that are specific to a group of instructions. The active values and the functions are manipulated as desired, resetting their initial value to zero after execution of "with". The values are evaluated sequentially. The "context" argument is a list of variables and associated values (ownership list) which can be reused in several "with" functions. The "with-eval" functions evaluates the expression and then uses it as context. Taking the structure of the SML interpreter into account, "with" works both with active values and with functions.

The principal input/output functions are enumerated below.

"Close": Makes it possible to end the processing of an object in a flow. Converse instruction from the "open" instruction described below.

"Load": This function enables loading and executing an SML file, specified by "filename", by using a search path specified by a variable. A first attempt is made to find a file designated as "filename SML" in each directory of the specified path. Finally, if the file is not found, a search is made for a file designated as "filename". If the name of the file includes a "/" character, this name is considered to be an absolute path name, and the search path is not used. If any error occurs at the moment the file is read, an error message is transmitted, and the subsequent reading of the file is stopped. If the file is found, the function returns the name of the file in the form of a string. If the file is not found and the keyword "if-does-not-exist" is specified, then either an error is signaled or the "nil" function is returned. If the file is not found and the keyword "if-does-not exist" is not specified, an error is signaled.

"Open": Makes it possible to open the processing of an object in a flow. This functions creates a flow of objects by opening the file "filename" and returns an object of the "flow" type. The keywords and their corresponding values determine the type of flow to be created, and the choice between input, output, or both is specified by the keyword ":direction", and the direction is one of the following:

: input : input flow (by default)

: output : output flow

: io : bidirectional flow

The keyword: "if-exists" specifies the action to be taken if the file exists and is open in ":output" or ":io", and the key value is one of the following:

: append : The outset position is the end of the file (by default).

: overwrite : The outset position is the beginning of the file, and the contents of the current file, if any, are not overwritten.

: supercede : The outset position is the beginning of the file, and the contents of the current file, if any, are replaced.

The keyword ":type" specifies the type of file; the key value is one of the following:

: file : The flow created is a UNIX file (by default).

: string : The flow created is an internal string.

The input/output functions, such as "read" or "print" (described below) may be applied, as can the commands for manipulating the string.

The key word ":buffered" specifies whether the buffer register should or should not be implied upon each output operation, and the key value is one of the following:

nil: should not be emptied;

t: should be emptied (by default).

"prin1": This function prints the SML objects; each object is specified in its natural form, that is, without spacing and without division between lines. The function returns the last object evaluated. The output is "emptied" at the end of the call, depending on the value of the key word ":buffered" in the "open" function.

"Print": This function makes it possible to print a new line and then each SML object, each object being printed without spacing or division between lines. The function returns the last object evaluated. The output is again "emptied" at the end of the call, depending on the value of the keyword ":buffered" in the "open" function.

"*Print-readably*": Makes it possible to control the appearance of the printing. *Print-readably, is a variable. If the value is "nil" (by default), then any output can be read; that is, special characters are interpreted to improve legibility. If the value is "true", any output is printed as if it contained special characters, except for the escape sequences, which are always interpreted without taking into account the value of *print-readably*.

"*Print-level*": Makes it possible to control-printing of the depth of the lists. This function is a variable that controls the maximum depth of the lists to be printed.

"Provide" and "require": These functions manage the loading of a file. They help in determining whether an SML file has been loaded in such a way as to prevent its being loaded a second time. The common argument "file" must be a symbol which defines the file using its printing name. The "file" symbol is then defined at the value "nil" by one or the other function. The "require" function looks for whether the file is present and then loaded into SML. If the file is not present, then either it is loaded or nothing is done. Confirmation that a file has already been loaded is given by the "provide" function. The "provide" function confirms that the file has been loaded. This function is generally invoked in the loaded file.

"Read": Enables the reading and interpretation of a string. This functions reads the next expression in the input flow, if that is specified, or if not in "the standard input", analyzes it and returns it. At the end of the file, the function executes a "throw" to the "end of file" label.

"Read-char": This functions reads a character in the input flow, if that is specified, or in "the standard input" and returns it. This function is useful for binary files in which the bytes can be read in this manner.

"Read-line": This function reads a character string in the input flow, if that is specified, or if not in "the standard input" and return it, not taking the new line at the end into account. At the end of the file, it executes a "throw" to the "end of file" label.

"*Standard-error* or *standard-input* or *standard-output*": Functions used for standard flows. They correspond to global variables, and if not are defined by default at the associated values. If a variable is defined at the value "nil", it is reset to its value by default.

"Write-char": This function writes a character on the output flow, if that is specified, or if not on the "standard output" and returns the character. This function is useful for creating binary files in which the bytes can be written in this way.

"Write-line": This functions writes a string of characters on the output flow, if that is specified, or if not on the "standard output" and returns the string.

The definitions of the principal symbols follow:

"Defconstant": This function announces and defines a variable at a given value, which cannot be labeled in a "setq" or "let" function.

"Defvar": This functions announces that the specified variable is a global variable. The global variables can be read dynamically by "let" constructions.

"Documentation": sets or retrieves a documentation. If "string" is not specified, this function retrieves the documentation for the specified symbol. If the documentation does not exist, the value "nil" is returned. If "string" is specified, it is associated with "symbol", and an error appears if the symbol is not defined. The "documentation" may be defined by the "defvar", "defconstant", "defun", and "defmacro".

"Gensym": This functions generates and returns a new symbol. Its name is composed of the letter G, followed by a number incremented upon each function call.

"intern": This functions creates and returns a symbol (of a string) whose name is "string".

If a symbol with the same name is found, it is returned. This function is useful for creating "atoms" with special characters incorporated, such as "*" or blanks (spaces).

"Makunbound": This functions makes a symbol indefinite in such a manner that if the function "boundp" (described below) is applied to it, the value "nil" is returned.

The definitions of the principal attributes follow:

"/=": This is the test of inequality of the objects, which returns the "true" value is an object 1 is different from an object 2, and if not returns the value "nil".

"<": This is the test of strict inferiority, which compares two numbers and two strings and returns the value "t" if the first argument is less than or equal to a second one, and if not the value "nil" is returned. The strings are compared alphabetically.

"<=": Test of inferiority which compares two numbers or two strings and returns the value "t" if the first argument is less than or equal to the second one, and if not, the value "nil" is returned. The strings are again compared alphabetically.

">": Test of strict superiority, which compares two numbers or two strings and returns the value "t" if the first argument is greater than and not equal to the second one, and if not the value "nil" is returned, the strings being compared alphabetically.

">=": Test of superiority, which compares two numbers or two strings and returns the value "t" if the first argument is greater than or equal to the second one, and if not the value "nil" is "And": This is a "logical AND" between expressions, which evaluates each "form" from left to right. If a form is evaluated at the value "nil", the function returns this value "nil"; if not, the value "t" is returned. If no argument is specified, the function returns the value "t".

"boundp": This functions tests whether an atom has already been defined. It returns the evaluated symbol if it has been defined, and if not the value "nil" is returned. This function is verified if the variable called "symbol" has a value.

"compare" : This function requires the comparison between two numbers or two strings and returns one of the following values:

A strictly positive number if the first argument is greater than the second one.

Zero, if the first and the second argument are equal.

A strictly negative number if the first argument is less than the second one.

"Eq" : Test of strict equality between two objects, which is verified only if the two objects are located at the same location in memory.

"Equal" or "=": Test of equality between two objects, which returns the value of the object 1 if it is the same as that of the object 2, and if not, the value "nil" is returned. The equality of the lists is verified by testing the equality of each of their elements.

"()" or "nil" : This is the value "nil" of the conventional Lisp language, in which an object is "true" if it is not "nil".

"Not": This is a "logical NO"; the value "t" is returned if the object has the value "nil", and if not it is the value "nil" that is returned.

"Or": This is a "logical OR" between expressions. It evaluates each form from left to right. If a form is evaluated at a "not nil" value, this evaluation is returned. If all the forms are evaluated at the value "nil", the last evaluation is returned.

"t": This is the true logical value.

"Type t": This is the "data type" attribute. This function returns "type" if the object is of this type, and if not the value "nil" is returned.

The list function definitions follow:

"Append": This function makes it possible to construct and return a new list or new string by concatenation of the arguments.

"Copy": This function copies an SML object and returns a copy of the object, which must be a list.

"Length": This function returns the number of elements of a list, or the number of characters of a string.

"List": This function constructs and returns a list of evaluated arguments.

"List-get" or "list-put" or "list-put!": These functions make it possible to obtain or define a value in a list. "List-get" returns a value in a list. "List-put!" changes the list and returns it, while "list-put" returns a new updated list. The value may be specified by a number (position) or an attribute (symbol). If an attribute is used, the list is considered to be an ownership list, and the labeled element of the list is the one that is just after the symbol in the list. If the position is used, this refers to the position of the element in the list beginning at zero. If the "position" is greater than that of the last member of the list, then "List-get" returns the default value if it is specified, and not the value "nil".

"List-put" and "list-put!" insert the new member of the list in the correct position by filling the non-specified positions with values "nil" if necessary. If an "attribute" does not correspond to an existing attribute, then "list-get" returns the value by default if it is specified, and if not returns the value "nil".

"List-remove" or "list-remove!": These functions make it possible to remove one or more elements from a list. "List-remove!" changes the list and returns it, while "list-remove" returns a new updated list. When an "attribute" is used, the list is considered to be an ownership list. In that case, the attribute element and the one following it in the list are removed. If the "position" is used, this refers to the position of the element in the list beginning at zero. If the "attribute" is not paired with an existing attribute, or if the "position" is greater than that of the last member of the list, the list is unchanged.

"Make-list": This function constructs and returns a list containing the size of the elements, in which each element is initialized by "form", if this attribute is present, and if not by "nil".

"Map":This function applies a function to the elements of the lift or lists specified, returning a list or a string depending on the value of the "type of result", which determines what is constructed. The function applied must accept as many arguments as the number N of list arguments furnished. The N lists must have the same length L. The "Map" function returns a list or a string of length L, having as its elements the result of the call of the function with the L elements of the list, if a list is specified, or if for a plurality of lists the first elements of each list are specified, then the second elements of each list are returned, up to L elements.

"Maphash": This function applies a "function" with two arguments, each key and the corresponding value in the ownership list. It always returns the value "nil". It can also be used with a table.

"Nconc": This function executes the concatenation of a list 1 with each list. It physically modifies a sequence of a list or a string and returns the list 1.

"Position": In the first form, the list is analyzed with the "equal" attribute. If an "item" element is present, the function returns its index to the list beginning at zero; if not, it returns the value "nil". In the second form, the appearance of a "substring" element is looked for in the string. If this element is present, the function returns the position of the character at which it begins; if not, the value "nil" is returned.

"Reverse": This function returns a new list with the same elements but in reverse order.

"Sort": This functions puts the list in increasing order, using the "comparison" function.

The function named the "comparison" function is invoked with two elements to compare and must return an integer. Its value will be negative, zero, or positive, depending on whether the first argument is smaller than, equal to, or larger than the second one.

"Subseq": This function returns a sublist beginning at the element at the "start" position up to the element at the "end" position. "Start" and "end" are numbers beginning at zero. If the number of elements indexed is greater than the table of the list, the sublist returned is defined at the value "nil". This function may also be used with a string.

The definitions of the string and table functions follow:

Since a string is processed like a list of characters, list functions may also be used for strings, such as: "append", "length", "map", "max" "NCONC" "position" and "subseq".

"Match": This function makes it possible to match up and extract substrings from an SML string.

"String-down case" or "String-up case": These functions return a copy of a string after conversion.

Similarly, a certain number of list functions may be used to process the tables, such as:

"List-get", "list-put", "list-put!", "list-remove!", and "maphash". An object in a table is created by using the "coerce" function applied to an ownership list.

The definitions of the macros follow:

"Backquote" or "''": This functions creates a copy of a specified list using the list as a template for creating the copy.

"Defun": Makes it possible to define an SML function. This is the typical way of creating a new function defining the name of the function by using the parameters spelled out in the "lambda" list and in the "form".

"Defmacro": This function defines an SML macro. This is the normal way to define a new macro defining the name of the macro by using the parameters spelled out in the "lambda" list and in the "form".

"Lambda": This function defines a "lambda" expression, which is the basic form for determining an anonymous function by using "lambda" expressions. A "lambda" expression is composed of a lambda symbol, a lambda list, and the body of the lambda expression. A lambda list specifies the parameters. When a function is invoked, its arguments are matched with the parameters of the corresponding lambda list. If the parameters required are specified, the corresponding arguments must be present when the lambda expression is applied. A "lambda" list can use key words, beginning with the symbol & and defined as follows:

& optional: Optional parameters; if these arguments are not used, they are linked with the initial value, if one exists, and if not with the value "nil".

& rest: Resting parameters; when all the required and optional parameters are linked, then any following argument is created in a list and is linked with the resting parameters.

& key: Keyword parameters; these are arguments constituted of pairs including the key word calls and its value.

& aux: These are local variables, which are not actually parameters; this is the equivalent of the "let" function.

"Lambdamacro": This function defines a lambda macro function, which is the basic form for defining an anonymous macro. If parameters required are specified, the corresponding arguments must be present when the lambda expression is applied. A "lambdamacro" list can use key words beginning with the symbol & and defined in a manner equivalent to those of the "lambda" list: & optional, & rest, & key and & aux.

The definition of various numerical and other operators follows:

"+": Operator of addition of numbers; it may also be used as a concatenation operator for lists or strings. The type of result is determined from the type of the first argument: ( ) for a list, "" for a string, and 0 for a number.

"*" and "/": Arithmetical operators which return the modulo, product and quotient of the arguments, respectively.

"-": operator of arithmetical difference.

"Logand", "logor", "lognot", "logxor": Operators that correspond to the operations of "logical AND", "logical OR", "logical NO" and "logical EXCLUSIVE OR" respectively.

"Max" and "min": Operators that return the maximum or minimum value, respectively, of a list of numbers or strings.

"Random": Operator that generates a random number.

"Coerce": Its function is to specify a type and convert the type of an object into that specified by the "type of result".

"Type-of": Its function is to return the internal SML type of the object.

"!" or "!!": Execute an interpreter command; "!" executes the given command as a string with its given arguments and does not wait for the end of the operation, while "!!" returns an input/output flow in relation to the input and output commands, this command being cancelled if the flow is cut.

"*Application-class*": This is a string constant that indicates the class of the application being run; for an SML application, the value is "SML".

"*Application-name*": This is a string constant that indicates the number of the application being run.

"Command-line-args": This function returns a list of strings that represents the arguments transmitted by the interpreter to SML at the time of startup.

"Get-internal-run-time": This function makes it possible to return the value of the execution or run time in milliseconds; if no argument is furnished, the value returned corresponds to the elapsed time, and if not the value depends on one of the following key words:

: Real : The time elapsed from the startup of the SML application (by default).

: User : The CPU time used during the execution of SML instructions.

: System : The CPU time used by the system for the SML computation.

"Getenv": If the variable name of the string is the name of an output variable of the interpreter, this functions returns this value as a string; if not, the function returns the value "nil".

"Setenv": This function defines the name of a variable of the interpreter of the value; these two arguments must be strings.

It is additionally possible with SML to differentiate the evaluation of expressions. The evaluation occurs then after a specified time and when any request has received its response. The internal representation of the time for the SML functions is the millisecond.

"Eval-after": The evaluation of expressions will be done after a certain period of time, this function taking place in two phases:

When "eval-after" is invoked, each form to be evaluated thereafter is saved with its context.

After the period of time specified, the context is linked and each form evaluated.

This function return an object of the "timer" type, which can be reset to zero by the "remove-timer" function described below.

"Eval-every": This function is similar to the preceding one but performs repetitive evaluations; it can certainly be reset to zero by the "remove-timer" function.

"Remove-timer": This function cancels an object of the "timer" type constructed by one of the functions "eval-after" or "eval-every".

SML also uses debugging tools, in particular the following functions:

"Hashinfo": This function furnishes statistics on the storage of atoms. The information returned is the number of symbols, the number of insertions into the table, and the number of collisions.

"Meminfo": This function furnishes and prints the status of the memory allocator used by SML.

"Oblist": This function returns and prints the names of the SML atoms already defined. If the "string" symbol is not specified, all the names defined are returned; if not, only the names containing the "string" symbol are returned.

"Stack-print-level": This function furnishes the number of structures of a stack printed by mistake.

"Trace-untrace": The "trace" function returns the list of functions executed up to its request. The "untrace" function returns the list of functions not yet executed up to the request, if any exists, and if not returns a value "nil".

Figure 2:
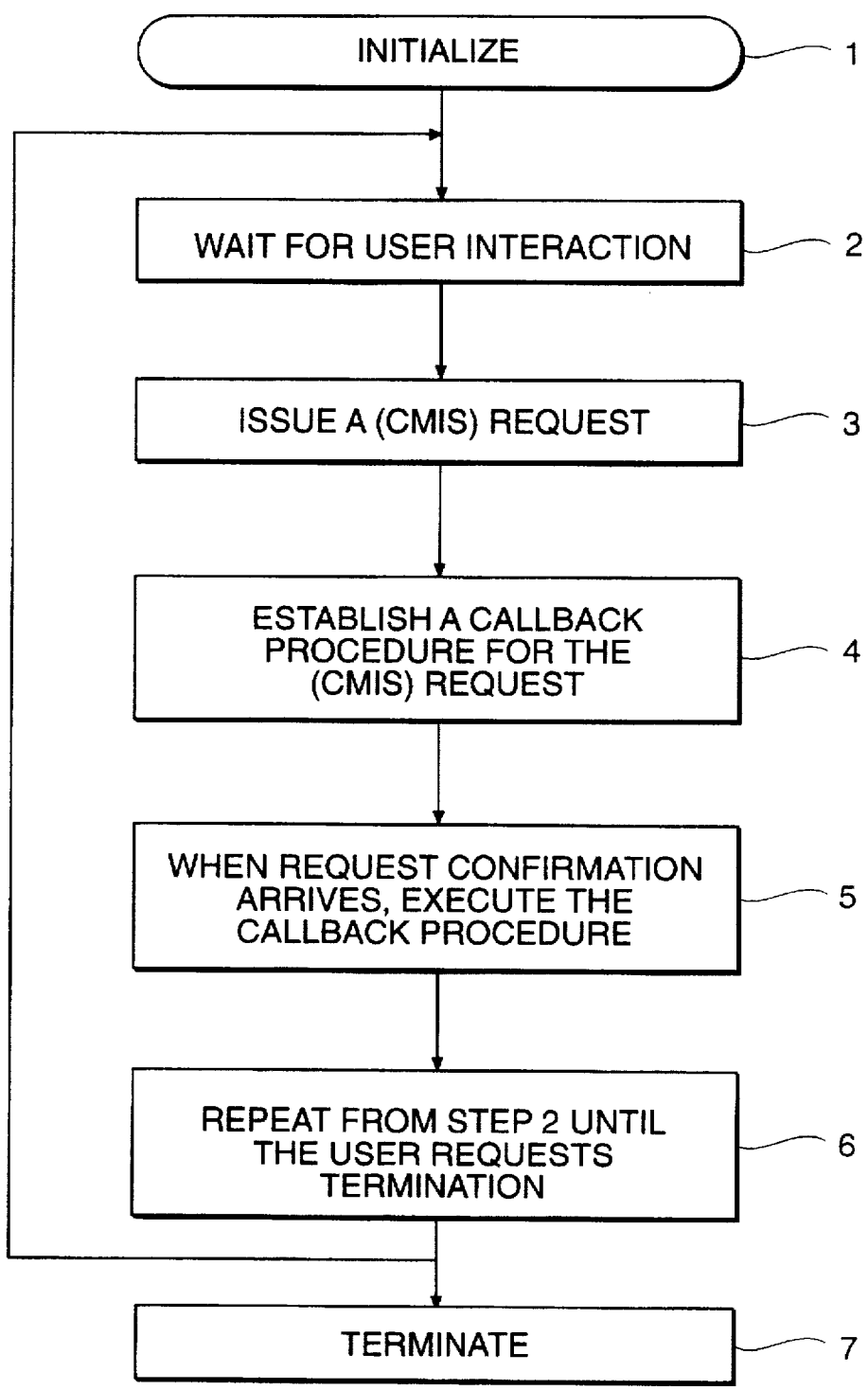
FIG. 2 shows a flow chart of the operations of an SML application which uses the management services and FIG. 3 shows a flow chart of the operation of an SML application which uses the management services and the external libraries.

As to the set of functions MIF, and as has already been noted above, this set enables access to the external library "MIU", which in turn serves as an interface with the network and information system management services in the context of an exchange of information between an application and an object manager. Taking into account concepts of programming relating to the network and information system management services, such as CMIS, an SML application must be capable of performing the following operations as illustrated in FIG. 2:

1) initialization of the services;

2) waiting for an action by a user;

3) transmission of a request for the network and information system management services;

4) setting up of a callback procedure for each request;

5) execution of the callback procedure when the request confirmation arrives;

6) repetition from step 2 until the last request by the user;

7) end of the application.

The set of functions XAF, in turn, enables access to the library XML, which has components available for developing and managing graphical user interfaces, such as X/Motif.

The architecture of a system of the X Window type is based on the client-server model.

The server manages all the input and output devices (such as the mouse). It creates and manipulates the windows on the screen and produces text and graphics. The application that uses the facilities offered by the server is called the client. The client communicates with the server after connection to the network by means of particular protocols. The server communicates with the clients by sending "events" to the client applications; a trivial example is when the server generates an event in response to an action exerted upon the mouse by a user. In the present context, this means that this type of event is taken charge of by the SML interpreter, and that a callback function specified for it is executed.

Figure 3:
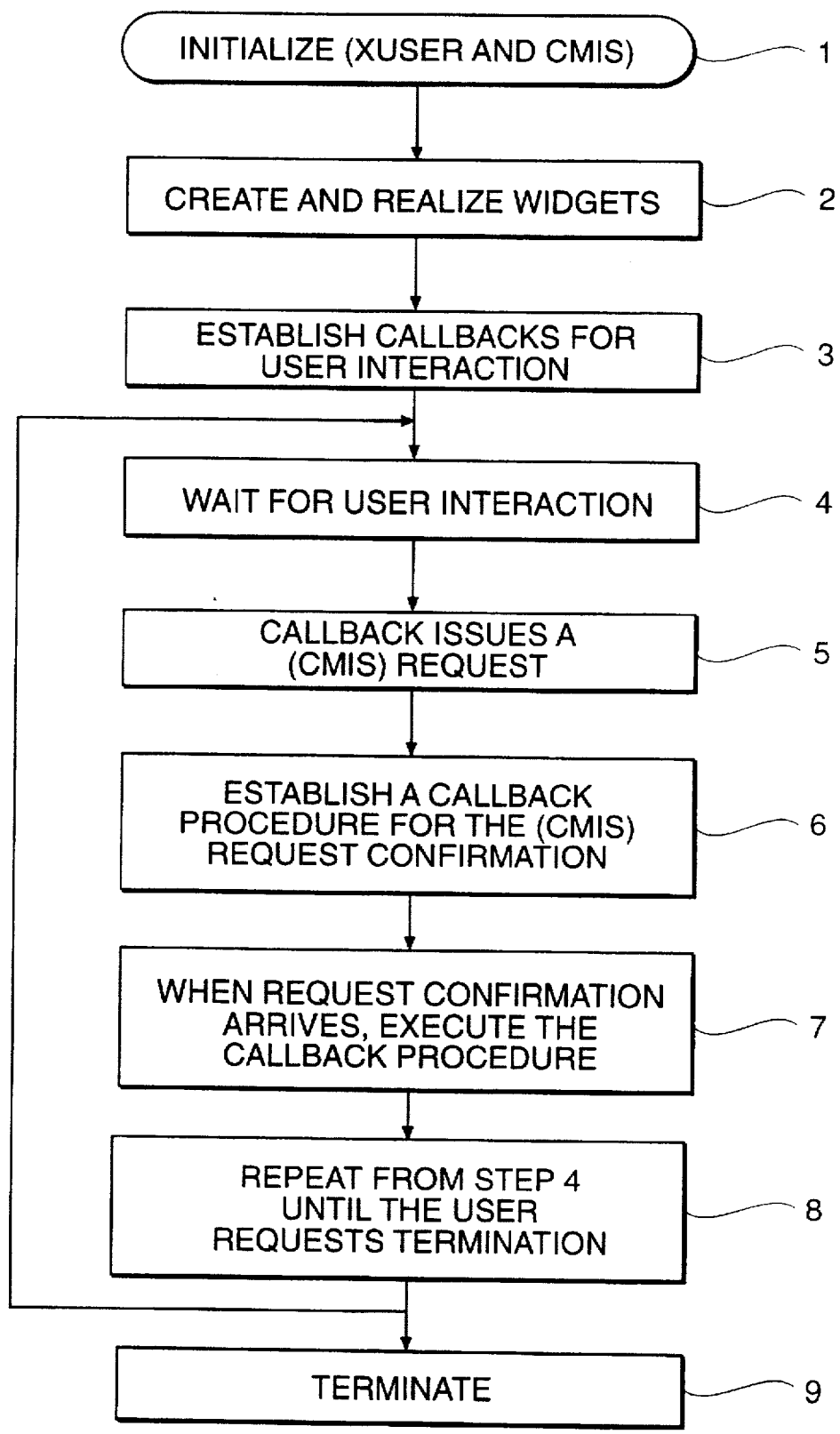

As shown in FIG. 3, an SML application using the network and information system management services, such as CMIS, at the same time as the external libraries enabling the development and management of graphical; user interfaces, such as X/Motif, must perform the following operations:

1) initialization of the two types of services;

2) creation and representation of user interface components, called "widgets".

3) setting up of callback procedures for user interactions;

4) waiting for an action by a user;

5) transmission of a request, by means of a callback procedure, for the network and information system management services;

6) setting up of a callback procedure for each request;

7) execution of the callback procedure when the request confirmation arrives;

8) repetition from step 4 up to the last request by the user;

9) end of the application.

The set of functions GAF in turn enables access to the library GOL authorizing the applications that use the graphic objects. Such applications make it possible to present and edit graphical objects is two dimensions from graphics libraries, which may be integrated with existing user interfaces, such as X/Motif, MS-Windows, Post Script, etc.

The role of the SAF functions is to authorize access to a specific library SLL of a structured language, such as SQL which in turn serves as an interface with relational data bases, such as INGRES (trademark of Ingres Co.) and ORACLE (trademark of Oracle Corp.), etc.

The functions SAF offer two levels of functionalities.

The first one makes it possible in the SML environment to construct standard requests in the structured language; the functions used at this level do not interact with the data base server. At the second level, the functions used interact with the data base server to authorize, among other actions, connection to or disconnection from the server and updating when changes are desired, among Other actions.

SML-specific SAF functions make it possible to realize the interface with the library SLL; the principles can be summarized in this way:

"sql-login": Enables connection to a data base server identified by the "connectid" parameter. This parameter is a string specifying the name of the data base server. If the connection is made the function returns the value "t", and if not the function "sql-error" (described below) is invoked and the value "nil" is returned.

"sql-logout": Enables disconnection from the data base server. This function terminates the current logical job unit. If a unit is in progress, it makes permanent any changes made during unit of work (commit), and the disconnection is made.

"sql-build-delete": Makes it possible to create a cancellation request as a string.

"sql-build-insert": Enables creating an insertion request as a string.

"sql-build-select": Enables creating a selection request as a string in the form of a list.

"sql-build-update": Enables creating a request for updating in the form of a string.

"sql-oper": Enables creating a conditional proposition as a string.

"sql-exec": Submission of a request by means of a "command" parameter to a data base server for execution.

The "command" parameter may be either a string or a result returned by one of the "sql-build-xxx" functions above. This function cannot be used except after effective connection with the data base server.

"sql-commit": Terminates a job unit by making permanent changes made during this job unit.

"sql-rollback": Terminates a job unit without taking changes made during this job unit into account.

"sql-error": This function is invoked in case of failure of a request.

"sql-get-error": Returns the last message of the data base server in response to the last request.

In general, the types of data in the structured language have their equivalents in the SML language; hence a correspondence between these two languages exists. Similarly, the names of tables and attributes in structured language are represented as atoms in the SML language (such as the Lisp language), it being understood that the values have their correspondence in these two languages.

It is also possible to write extensions to SML. To do so, the new functions must be written in C-type language and then compiled and then concatenated with the SML libraries.

A new extended SML interpreter is then obtained. In general, the development of an SML extension involves the following steps:

Development of a code in C-type language for the primitive that must be invoked each time a reference is made to a new SML name.

Making the association between the name of the new SML function and the name of the primitive in the compiled external library.

Construction of the new SML interpreter by linking all the libraries required.

In conclusion, this kind of programming language makes it possible to considerably shorten the time for development of an application. Hence the language used according to the invention, in which the typing bears on the contents of the variables rather than on the variables, makes it possible for interfaces for access to servers to be made which are very significantly simplified and which facilitate generic programming, the structure of the data being manipulated directly without any conditions. In effect, the SML variables have no type, because they are assumed all the exist in an indeterminate state (value "nil"), and it is at the moment of an assignment that the type is at the same time defined, thus authorizing a generic programming. This is a powerful advantage relative to the C-type languages, for which the types are compiled, which requires knowledge of them before programming. In addition, such a language, which has a cartesian nature and facilitates interfacing with various information servers, is advantageously used as a very high-level language for management applications. For example, it enables access to a library specific to a structured language, such as SQL, by respecting the cartesian nature of this language. In addition, it makes it possible to create interfaces that respect the treelike nature of a plurality of servers, as in the case of network administration platforms, for example.

Another major advantage is derived from the fact that the code that can be executed can easily and naturally be modified by itself in order to adapt to the types of data received. Hence an application can transmit a request to the network to ask the value of an administrative object without knowing its structure, and can then dynamically construct the display and updating functions adapted to the structure of the object received. In fact, as seen above, the fact that there is no difference between the program and the data means as a consequence the program can modify itself, and that an application is modified dynamically as a function of the data that it manipulates.

Furthermore, the use of a language such as SML, which has a similar representation for the programs and the data, is particularly easy and advantageous. In effect, such a language offers great ease of use, extreme flexibility, and considerable power, making it possible to transmit a code fragment having one direction for itself, an example being a transaction, offering a balance in the load between dynamic controlled processors, and authorizing dynamic modification of the code during execution. Depending on this use, the code is carried here with an ease and flexibility that are identical to that of a simple data transfer.

We claim:

1. A method of programming an information processing system having a plurality of data processing devices connected with a network and having access to data stored in complex structures, such as sets or trees, said method comprising the steps of:

providing a programming language on said information processing system in which data types of variables used therein are defined by the content of the variables;

allowing program variables used with said programming language to be defined without assigning a predetermined data type thereto;

developing application programs of the network management type on the information processing system using said programming language;

manipulating said complex data structures using said application programs by requesting and receiving data from said complex data structures without designating particular data types of the data to be received; and providing a language interpreter for said programming language on each of said plurality of data processing devices, said language interpreter comprising a kernel for processing the application programs to be executed and a set of functions (SOF) including basic functions of said programming language and extended functions for providing an interface with external libraries (LIB).

2. The method as defined in claim 1, further including the step of providing said language interpreter with a kernel for processing the application programs to be executed, internal services including an evaluator and memory manager, means for executing primitive functions of the programming language, and a documented programmatic interface between the kernel and said means for executing the primitive functions, and further including the step of enabling access, through said interface, to a plurality of external libraries which enable use of additional primitive functions not provided by said programming language.

3. The method as defined in claim 2, further including the step of providing said language interpreter with a set of functions employing said primitive functions, wherein said set of functions includes functions specific to said programming language and extended functions which enable access to said external libraries, and further wherein said functions have a similar representation for programs and data.

4. The method as defined in claim 3, further including the steps of using said language interpreter to enable said application programs to request access to said network and to information management services, and further including the steps of using said language interpreter for:

initializing said information processing services;

waiting for an action by a user of said information processing system;

transmitting a request for access to the network and to said information management services;

setting up a callback procedure for said request;

executing said callback procedure when a request confirmation arrives;

waiting for and receiving a final request from said user; and ending the application programs.

5. The method as defined in claim 3, further including the step of using said application programs and said language interpreter to request access to network services, management information systems and libraries, wherein said libraries include means for developing and managing graphical user interfaces therein, and further including the step of using said language interpreter for:

initializing said network services;

creating and representing user interface components;

setting up callback procedures for user interactions waiting for an action by a user;

transmitting a request by said user for said network services and information management services by using said callback procedure for user interactions;

setting up a callback procedure for said request;

executing the callback procedure when a request confirmation arrives;

waiting and receiving a final request from said user; and ending said application programs.

6. The method as defined in claim 2 wherein the programmatic interface authorizes application of said extended functions by way of said basic function which executes a function coding a primitive which calls a proper function enabling access to one of said external libraries (LIB).

7. The method as defined in claim 1 wherein said extended functions includes at least a first function (XAF) which enables access to a user interface library which furnishes information for developing and managing a graphical user interface and a second function (MIF) enabling access to a library (MIL) that serves as an interface with a network and information system management service.

8. The method as defined in claim 1 wherein the extended functions includes a first function (SA) enabling access to a library specific to a structured language (SLL) serving as an interface with a relational data base and a second function (GAF) enabling access to a library (GOL) which authorizes applications that use graphic objects developed.

* * * * *